(12) United States Patent
Hayashi et al.

(10) Patent No.: US 6,415,147 B2
(45) Date of Patent: Jul. 2, 2002

(54) SYSTEM FOR AVOIDING CONGESTION IN MOBILE COMMUNICATION AND METHOD OF DOING THE SAME

(75) Inventors: Takanori Hayashi; Toshitaka Ishii, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/789,827

(22) Filed: Feb. 22, 2001

(30) Foreign Application Priority Data

Feb. 23, 2000 (JP) ........................................ 2000-046500

(51) Int. Cl.$^7$ ............................. H04Q 7/20; H04B 1/38; H04M 1/00; G01R 31/08; G06F 11/00
(52) U.S. Cl. ........................ 455/433; 370/229; 370/318; 370/332; 370/333; 370/335; 455/436; 455/442; 455/453; 455/522; 375/377
(58) Field of Search ................................. 455/442, 453, 455/522, 436, 433; 375/377; 370/333, 318, 335, 332, 229

(56) References Cited

U.S. PATENT DOCUMENTS

| | | | | |
|---|---|---|---|---|
| 4,797,947 A | * | 1/1989 | Labedz | |
| 5,878,098 A | * | 3/1999 | Wang et al. | 375/377 |
| 6,108,322 A | * | 8/2000 | Kotozin et al. | 370/333 |
| 6,128,500 A | * | 10/2000 | Raghavan et al. | 370/335 |
| 6,216,004 B1 | * | 4/2001 | Tiedemann, Jr. et al. | 455/442 |
| 6,233,222 B1 | * | 5/2001 | Wallentin | 370/229 |
| 6,256,501 B1 | * | 7/2001 | Tokuyama et al. | 455/442 |
| 6,259,920 B1 | * | 7/2001 | Kusaki et al. | 455/442 |
| 6,259,927 B1 | * | 7/2001 | Butovitsch et al. | 455/522 |
| 6,263,203 B1 | * | 7/2001 | Jahn | 370/332 |
| 6,275,478 B1 | * | 8/2001 | Tiedemann, Jr. | 370/318 |
| 6,275,703 B1 | * | 8/2001 | Kalev | 455/436 |
| 6,324,403 B1 | * | 11/2001 | Jalloul | 455/453 |
| 2001/0005676 A1 | * | 6/2001 | Masuda | 455/433 |
| 2001/0016494 A1 | * | 8/2001 | Hayashi et al. | 455/442 |

FOREIGN PATENT DOCUMENTS

| | | |
|---|---|---|
| JP | 2702437 | 10/1997 |
| JP | 10-79985 | 3/1998 |
| JP | 10-145834 | 5/1998 |
| JP | 11-164346 | 6/1999 |
| JP | 11-275622 | 10/1999 |

* cited by examiner

Primary Examiner—William Cumming
(74) Attorney, Agent, or Firm—Sughrue Mion, PLLC

(57) ABSTRACT

A system for avoiding congestion in mobile terminal communication, includes (a) a plurality of mobile stations, (b) a plurality of base stations, and (c) a base station controller connected to the base stations through a common communication line. The base station controller (a) monitors an activity ratio of a down common communication line, (b) when it is judged that the activity ratio of a down common communication line may be congested, assigns an order of precedence to each of the mobile stations using the common communication line, based on the number of base stations to which each of the mobile stations concurrently makes communication, and (c) abandons low-rate voice frames at a constant ratio among voice frames of a mobile station to which a low order of precedence is assigned.

57 Claims, 4 Drawing Sheets

FIG. 2
CONNECTION LIST

| MOBILE STATION | BASE STATION |
|---|---|
| 101 | 100, 200 |
| 201 | 200 |
| .. | .. |

FIG. 3
ABANDONMENT LIST

| TABLE NO. n | ACTIVITY RATIO $\eta n$ [%] | MINIMUM NUMBER Cn | FRAME RATE Rn | RATIO Dn [%] |
|---|---|---|---|---|
| 1 | $70 \leq \eta_1 < 80$ | 3 | 1/8 | 40 |
| 2 | $80 \leq \eta_2 < 90$ | 2 | 1/8 | 90 |
| 3 | $90 \leq \eta_3$ | 2 | 1/8 | 90 |
| 4 | $90 \leq \eta_4$ | 2 | 1/4 | 50 |

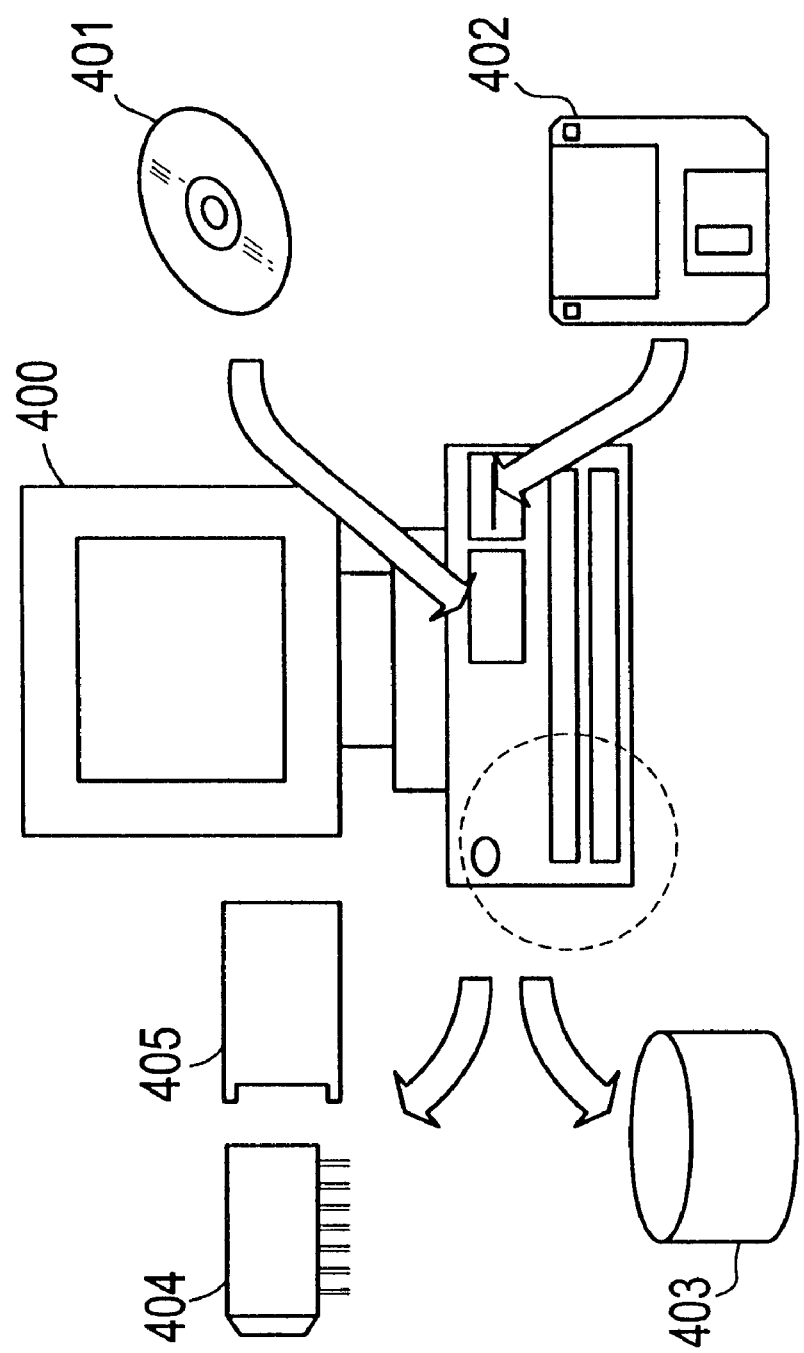

SYSTEM FOR AVOIDING CONGESTION IN MOBILE COMMUNICATION AND METHOD OF DOING THE SAME

BACKGROUND OF THE INVENTION

1. Field of the Invention

The invention relates to a system for avoiding congestion in a mobile communication system, and more particularly to such a system which avoids a common communication line between a mobile station and a base station controller from being congested due to an increase in traffic, and resultingly, avoids degradation in communication quality in a mobile station.

2. Description of the Related Art

According to the IS-95 type mobile communication system standardized by U.S. Telecommunications Industry Association (TIA), when a common communication line of an asynchronous transfer mode (ATM) type is used in communication between a base station and a base station controller, a mobile station is designed to be connected to a base station through a wireless channel, and a base station is designed to be connected to a base station controller, which is a host relative to the base station, through a common communication line.

Voice signals transmitted between a mobile station and a base station controller are encoded in four rates of FULL, ½, ¼ and ⅛ in dependence on an amount of data included in voice signals in accordance with the variable rate voice signal encoding system defined in the above-mentioned IS-95 type mobile communication system. When a user makes communication, voice signals are encoded at a relatively high rate to produce a long voice frame, whereas when a user makes little communication, voice signals are encoded at a relatively low rate to produce a short voice frame.

The thus produced voice frames having a variable length are turned into ATM cells, which are transmitted between a base station and a base station controller through a common communication line.

When a mobile station is in soft-hand-off condition, that is, when a mobile station is in a condition to make communication with a plurality of base stations, a base station controller transmits the same voice frames in the form of ATM cells to all base stations to which a mobile station is connected, through each of down common communication lines. Voice signals transmitted from base stations to a mobile station are synthesized at the mobile station in wireless form.

Voice signals transmitted from a mobile station are turned into ATM cells in all base stations to which the mobile station is connected, and are transmitted to a base station controller through an up common communication line. Then, the ATM cells are turned back to voice frames in the base station controller.

When a base station controller receives voice frames having the same order numbers in the same mobile station, through a plurality of base stations, the base station selects a voice frame having best quality, and transmits the thus selected voice frame to a host apparatus.

However, if a common communication line becomes congested due to an increase in traffic, voice frames existing between a base station and a base station controller are all abandoned before being turned into ATM cells.

There have been suggested a lot of systems for avoiding congestion in a mobile communication system.

For instance, Japanese Unexamined Patent Publication No. 11-164346 has suggested a mobile communication system in which one of hard-hand-off and soft-hand-off is selected so that a ratio of mobile communication terminals carrying out hard-hand-off is increased in the mobile communication system, ensuring reduction in communication traffic between a wireless base station controller and a wireless base station.

Japanese Unexamined Patent Publication No. 11-275622 has suggested an apparatus for carrying out hand-off among base stations. The apparatus is equipped in a mobile communication exchange including a control signal line and a communication line both of which are connected to another mobile communication exchange. The apparatus is comprised of a first table in which a frequency at which the control signal line is used is stored, a second table in which a frequency at which the communication line is used is stored, means for finding a non-used line with reference to the first table, when requested by a base station to carry out hand-off, and finding a non-used line with reference to the second table, when a non-used line cannot be found with reference to the first table, and means for carrying out hand-off through the use of the thus found non-used line.

Japanese Unexamined Patent Publication No. 10-79985, which is based on U.S. Pat. No. 6,108,322 filed by Michael D. Cotzin on Jun. 28, 1996 and assigned to Motorola Incorporated, has suggested a method of monitoring a channel by means of a mobile unit in a communication system for transmitting data frame. The method includes the steps of monitoring a signal quality of a current traffic channel, judging whether the signal quality of a current traffic channel is within a predetermined level, ignoring data received by the current traffic channel during a time-slot assigned to the mobile unit for receiving data, and monitoring a control channel during a time-slot assigned to the mobile unit for receiving data.

Japanese Unexamined Patent Publication No. 10-145834 has suggested a method of carrying out soft-hand-off between a mobile station and a plurality of base stations in a mobile communication system including a mobile station and a base station to which the mobile station is connected, the method including the steps of connecting adjacent base stations to each other through a channel logically separated from a mobile exchange, and carrying out soft-hand-off control led by one of a plurality of the base stations, through the channel between the mobile station and a plurality of base stations.

Japanese Patent No. 2702437 (Japanese Unexamined Patent Publication No. 8-265818) has suggested a mobile communication system having a function of switching a communication channel. The mobile communication system includes a first memory storing a threshold value, a second memory storing a level of a received electric field in association with a base station which transmitted the electric field, and a comparator which, on receipt of a warning that a level of an electric field is degraded, compares the level stored in the second memory to the threshold value. If a level of the received electric field is greater than the threshold value, a request of measuring a level of an electric field is transmitted only to a base station associated with the level greater than the threshold value.

The above-mentioned conventional systems for avoiding congestion in a mobile communication system is accompanied with a problem that when an activity ratio of a common communication line between a base station and a base station controller is increased, and at last, becomes congested due to an increase in the number of mobile stations covered by a base station, voice frames existing between mobile stations using the common communication line and the base station controller are all abandoned.

The conventional systems are accompanied further with a problem that when voice frames of a mobile station which is in a non soft-hand-off condition and which is connected to a base station controller through a common communication line which is a sole communication line for the mobile station, are abandoned, voice data lacks between the mobile station and a base station controller, resulting in degradation in communication quality.

SUMMARY OF THE INVENTION

In view of the above-mentioned problems in the conventional systems, it is an object of the present invention to provide a system for avoiding congestion in mobile communication which system is capable of reducing traffic in a common communication line and preventing degradation in communication quality in a mobile station using the common communication line as a sole communication line therefor.

In one aspect of the present invention, there is provided a system for avoiding congestion in mobile terminal communication, including (a) a plurality of mobile stations, (b) a plurality of base stations, and (c) a base station controller connected to the base stations through a common communication line, each of the mobile stations having a soft-hand-off function by which each of the mobile stations can make communication with the base stations, and having a function of encoding voice signals transmitted to and received from the base station controller, with a variable rate, the base station controller (a) monitoring an activity ratio of a down common communication line, (b) when it is judged that the activity ratio of a down common communication line may be congested, assigning an order of precedence to each of the mobile stations using the common communication line, based on the number of base stations to which each of the mobile stations concurrently makes communication, and (c) abandoning low-rate voice frames at a constant ratio among voice frames of a mobile station to which a low order of precedence is assigned.

For instance, the base station controller may be designed, when the activity rate increases, to gradually increase the ratio at which voice frames are abandoned among all voice frames, the rate of the voice frames, and the order of precedence of a mobile station transmitting and receiving voice frames to be abandoned.

It is preferable that the base station controller includes a first memory to store therein a first list of base stations to which each of the mobile stations using the common communication line concurrently makes communications, in which case, if there is a change in base stations to which each of the mobile stations concurrently makes communications, the first memory reflects the change to the list.

It is preferable that each of the base stations includes a second memory to store therein a first list of base stations to which each of the mobile stations using the common communication line concurrently makes communications, and wherein if there is a change in base stations to which each of the mobile stations concurrently makes communications, the first memory reflects the change to the list.

It is preferable that the base station controller includes a second list in which a rate of voice frames to be abandoned when the activity ratio of the common communication line reaches a threshold activity ratio, a ratio at which voice frames are to be abandoned among all voice frames, and the minimum number of base stations to which a target mobile station is connected are defined for each of activity ratios.

It is preferable that each of the base stations includes a second list in which a rate of voice frames to be abandoned when the activity ratio of the common communication line reaches a threshold activity ratio, a ratio at which voice frames are to be abandoned among all voice frames, and the minimum number of base stations to which a target mobile station is connected are defined for each of activity ratios.

It is preferable that the base station controller, when the activity ratio of the down common communication line reaches the threshold activity ratio, abandons voice frames at the rate and at the ratio without transmitting to the down common communication line in a mobile station or mobile stations using the down common communication line and connected to the base stations in a number equal to or greater than the minimum number of base stations.

It is preferable that each of the base stations, when the activity ratio of the up common communication line reaches the threshold activity ratio, abandons voice frames at the rate and at the ratio without transmitting to the up common communication line in a mobile station or mobile stations using the up common communication line and connected to the base stations in a number equal to or greater than the minimum number of base stations.

There is further provided a system for avoiding congestion in mobile terminal communication, including (a) a plurality of mobile stations, (b) a plurality of base stations, and (c) a base station controller connected to the base stations through a common communication line, each of the mobile stations having a soft-hand-off function by which each of the mobile stations can make communication with the base stations, and having a function of encoding voice signals transmitted to and received from the base station controller, with a variable rate, each of the base stations (a) monitoring an activity ratio of an up common communication line, (b) when it is judged that the activity ratio of an up common communication line may be congested, assigning an order of precedence to each of the mobile stations using the common communication line, based on the number of base stations to which each of the mobile stations concurrently makes communication, and (c) abandoning low-rate voice frames at a constant ratio among voice frames of a mobile station to which a low order of precedence is assigned.

In another aspect of the present invention, there is provided a method of avoiding congestion in a mobile terminal communication system including: (a) a plurality of mobile stations, (b) a plurality of base stations, and (c) a base station controller connected to the base stations through a common communication line, each of the mobile stations having a soft-hand-off function by which each of the mobile stations can make communication with the base stations, and having a function of encoding voice signals transmitted to and received from the base station controller, with a variable rate, the method including the steps of (a) monitoring an activity ratio of a down common communication line, (b) when it is judged that the activity ratio of a down common communication line may be congested, assigning an order of precedence to each of the mobile stations using the common communication line, based on the number of base stations to which each of the mobile stations concurrently makes communication, and (c) abandoning low-rate voice frames at a constant ratio among voice frames of a mobile station to which a low order of precedence is assigned, the steps (a), (b) and (c) being to be carried out by the base station controller.

The method may further include the step of, when the activity rate increases, (d) gradually increasing the ratio at which voice frames are abandoned among all voice frames, the rate of the voice frames, and the order of precedence of a mobile station transmitting and receiving voice frames to be abandoned, the step (d) being to be carried out by the base station controller.

The method may further include the steps of (e) storing therein a first list of base stations to which each of the mobile stations using the common communication line concurrently makes communications, and (f) if there is a change in base stations to which each of the mobile stations concurrently makes communications, reflecting the change to the list.

For instance, the steps (e) and (f) are to be carried out by the base station controller, or by each of the base stations.

The method may further include the step of (g) storing a second list in which a rate of voice frames to be abandoned when the activity ratio of the common communication line reaches a threshold activity ratio, a ratio at which voice frames are to be abandoned among all voice frames, and the minimum number of base stations to which a target mobile station is connected are defined for each of activity ratios.

For instance, the step (g) is to be carried out by the base station controller, or by each of the base stations.

The method may further include the step of, when the activity ratio of the down common communication line reaches the threshold activity ratio, (h) abandoning voice frames at the rate and at the ratio without transmitting to the down common communication line in a mobile station or mobile stations using the down common communication line and connected to the base stations in a number equal to or greater than the minimum number of base stations, the step (h) being to be carried out by the base station controller.

The method may further include the step of, when the activity ratio of the up common communication line reaches the threshold activity ratio, (i) abandoning voice frames at the rate and at the ratio without transmitting to the up common communication line in a mobile station or mobile stations using the up common communication line and connected to the base stations in a number equal to or greater than the minimum number of base stations, the step (i) being to be carried out by each of the base stations.

There is further provided a method of avoiding congestion in a mobile terminal communication system including: (a) a plurality of mobile stations, (b) a plurality of base stations, and (c) a base station controller connected to the base stations through a common communication line, each of the mobile stations having a soft-hand-off function by which each of the mobile stations can make communication with the base stations, and having a function of encoding voice signals transmitted to and received from the base station controller, with a variable rate, the method including the steps of (a) monitoring an activity ratio of an up common communication line, (b) when it is judged that the activity ratio of an up common communication line may be congested, assigning an order of precedence to each of the mobile stations using the common communication line, based on the number of base stations to which each of the mobile stations concurrently makes communication, and (c) abandoning low-rate voice frames at a constant ratio among voice frames of a mobile station to which a low order of precedence is assigned, the steps (a), (b) and (c) being to be carried out by each of the base stations.

In still another aspect of the present invention, there is provided a recording medium readable by a computer, storing a program therein for causing a computer to operate a base station controller in the above-mentioned system.

There is further provided a recording medium readable by a computer, storing a program therein for causing a computer to carry out the above-mentioned method.

The advantages obtained by the aforementioned present invention will be described hereinbelow.

In accordance with the present invention, if either a base station or a base station controller judges that a common communication line connecting the base station and the base station controller to each other may be congested due to an increase in traffic, low-rate voice frames of a mobile station which uses a plurality of common communication lines and which is in a soft-hand-off condition are first abandoned. Hence, it would be possible to reduce traffic in a common communication line and prevent degradation in communication quality in a mobile communication using a common communication line as a sole communication line therefor.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 illustrates a list showing correspondence between a mobile station and a base station or base stations to which the mobile station is connected.

FIG. 3 illustrates a list showing voice frames to be abandoned.

FIG. 5 illustrates examples of recording mediums in which a program for operating the system is to be stored.

DESCRIPTION OF THE PREFERRED EMBODIMENT

A preferred embodiment in accordance with the present invention will be explained hereinbelow with reference to drawings.

Figure 1:
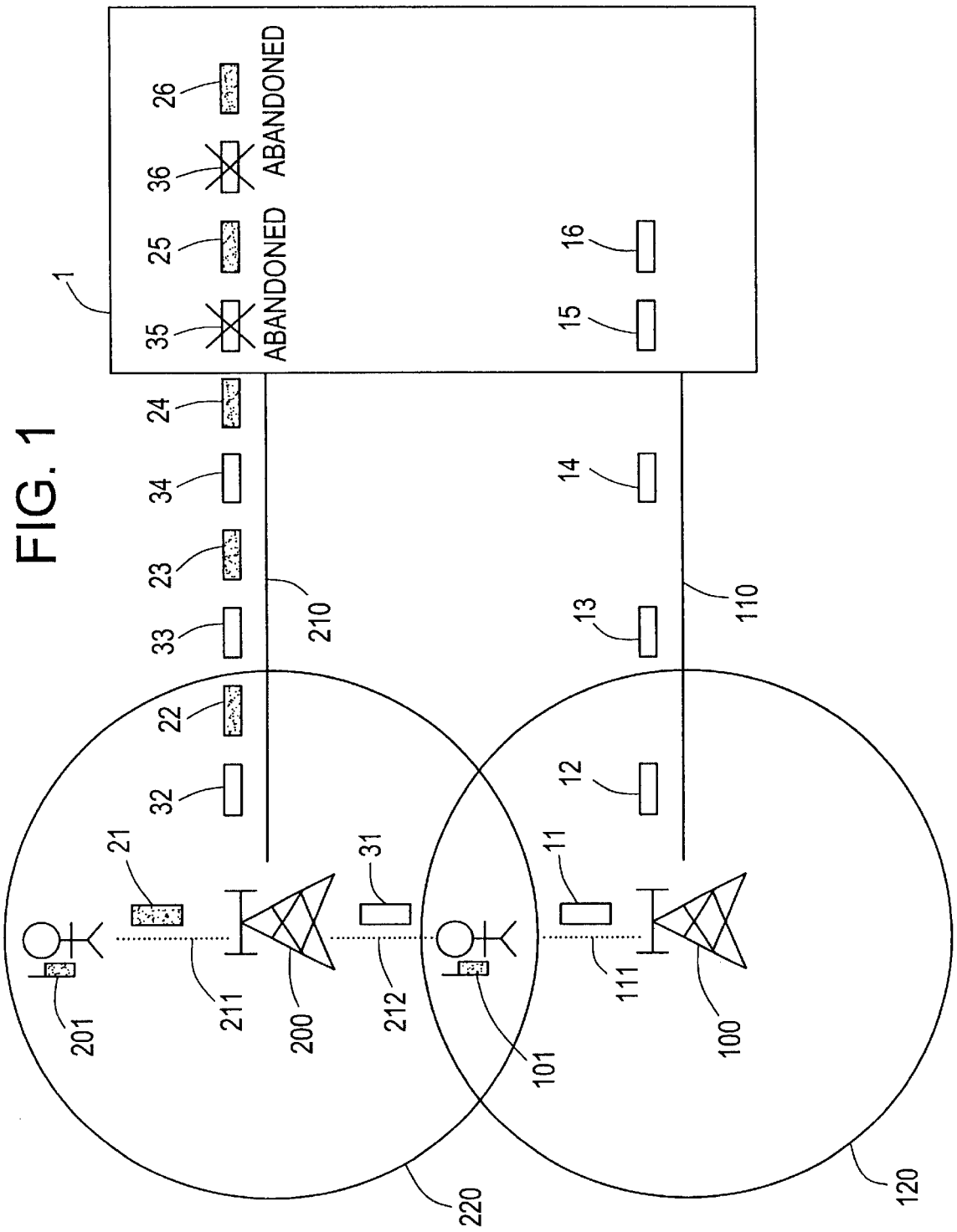
FIG. 1 is a block diagram of an embodiment of the system for avoiding congestion in mobile communication, in accordance with the present invention.

FIG. 1 is a block diagram of a system for avoiding congestion in mobile communication, in accordance with an embodiment of the present invention.

The system is comprised of a first base station 100 covering a first service area 120, a second base station 200 covering a second service area 220, a first mobile station 101, a second mobile station 201 moving within the second service area 220, and a base station controller 1 connected to the first base station 100 through a first common communication line 110 and to the second base station 200 through the second common communication line 210.

The first mobile station 101 is now located within the first service area 120, and is connected to the first base station 100 through a first wireless channel 111. The first mobile station 101 is connected to the base station controller 1 via the first base station through the first wireless channel 111 the first common communication line 110.

The first mobile station 101 is located also within the second service area 220, and is connected to the second base station 200 through a second wireless channel 212. The first mobile station 101 is connected to the base station controller 1 via the second base station 200 through the second wireless channel 212 and the second common communication line 210.

That is, the first mobile station 101 is now in a soft-hand-off condition.

The second mobile station 201 is connected to the base station controller 1 via the second base station 200 through a third wireless channel 211 and the second common communication line 210.

Voice signals addressed to the first mobile station 101 are encoded to voice frames in a variable rate in the base station controller 1, and then transmitted to the first mobile station 101 via the first base station 100 through the first common communication line 110 and the first wireless channel 111 and via the second base station 200 through the second common communication line 210 and the second wireless channel 212. The thus transmitted voice frames are synthesized to one another in a wireless form in the first mobile station 101.

Voice frames 11 to 16 each having a variable rate are transmitted from the base station controller 1 at a constant interval to the first mobile station 101 through the first common communication line 110.

Voice frames 31 to 36 each having a variable rate are transmitted from the base station controller 1 at a constant interval to the first mobile station 101 through the second common communication line 210.

Voice frames 21 to 26 each having a variable rate are transmitted from the base station controller 1 at a constant interval to the second mobile station 201 through the second common communication line 210.

The voice frames 11 to 16 are identical with the voice frames 31–36 in structure.

FIG. 2 illustrates an example of a connection list showing correspondence between mobile stations and base stations to be connected to the mobile stations.

As illustrated in FIG. 2, the first mobile station 101 includes a memory (not illustrated), in which base stations to which the first mobile station 101 is to be connected are stored. Similarly, the second mobile station 201 includes a memory (not illustrated), in which base stations to which the second mobile station 201 is to be connected are stored.

According to the list, the first mobile station 101 is connected to both the first and second base stations 100 and 200, and hence, is in a soft-hand-off condition. The second mobile station 201 is connected only to the second base station 200.

FIG. 3 illustrates an abandonment list in accordance with which voice frames are abandoned.

Each of the first base station 100, the second base station 200 and the base station controller 1 has such an abandonment list as illustrated in FIG. 3.

In the abandonment list, "n" indicates a table number, "Cn" indicates a minimum number of base stations to which a mobile station is connected, "Rn" indicates a frame rate, "Dn" indicates a ratio at which voice frames are abandoned, and "ηn" indicates an activity ratio of a common communication line.

For instance, the table number 1 indicates that when the activity ratio $\eta_1$ is equal to or greater than 70%, but smaller than 80%, 1/8 ($R_1$) of voice frames are to be abandoned by 40% ($D_1$) per a unit number of voice frames in all mobile stations which are connected to three or more ($C_1$) base stations among base stations using a common communication line.

The table number 2 indicates that when the activity ratio $\eta_2$ is equal to or greater than 80%, but smaller than 90%, 1/8 ($R_2$) of voice frames are to be abandoned by 90% ($D_2$) per a unit number of voice frames in all mobile stations which are connected to two or more ($C_2$) base stations among base stations using a common communication line.

The table number 3 indicates that when the activity ratio $\eta_3$ is equal to or greater than 90, 1/8 ($R_3$) of voice frames are to be abandoned by 90% ($D_3$) per a unit number of voice frames in all mobile stations which are connected to two or more ($C_3$) base stations among base stations using a common communication line.

The table number 4 indicates that when the activity ratio $\eta_4$ is equal to or greater than 90%, 1/4 ($R_4$) of voice frames are to be abandoned by 50% ($D_4$) per a unit number of voice frames in all mobile stations which are connected to two or more ($C_4$) base stations among base stations using a common communication line.

Figure 4:
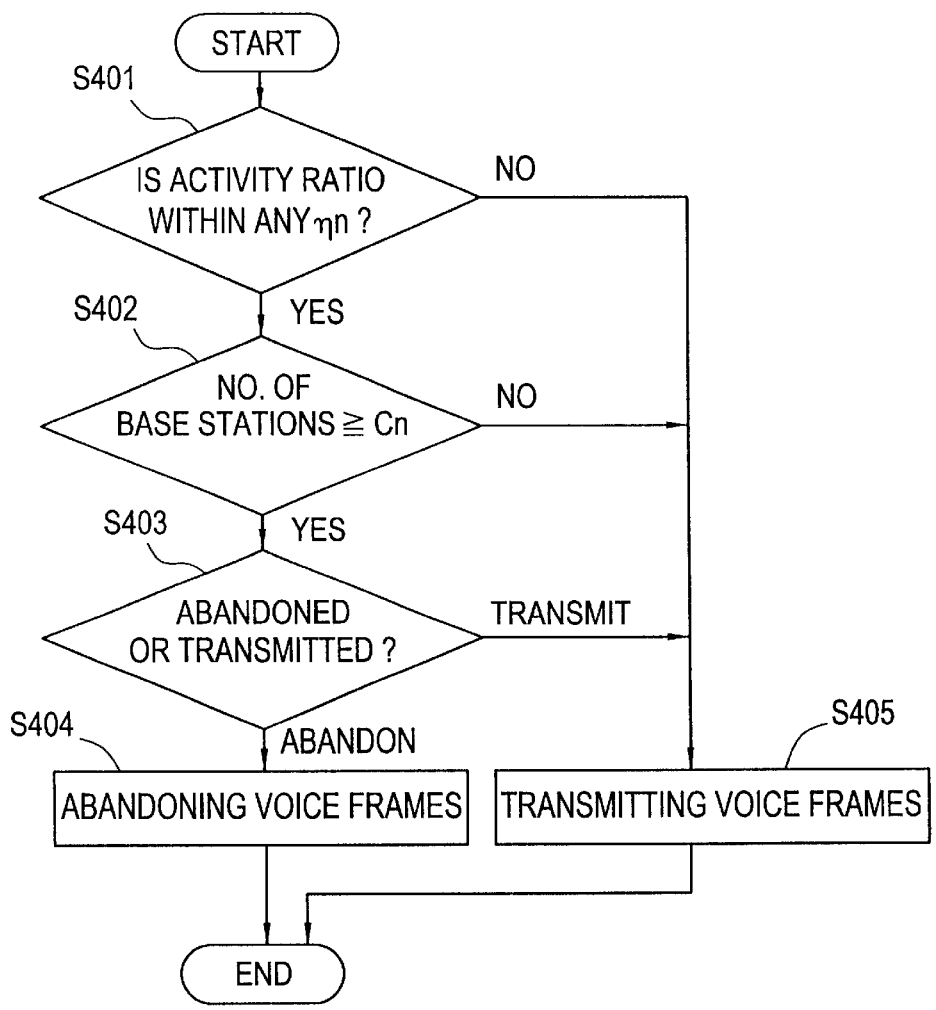
FIG. 4 is a flow-chart showing an operation of the system illustrated in FIG. 1.

FIG. 4 is a flow-chart showing an operation of the system for avoiding congestion in mobile communication, in accordance with the embodiment.

The operation shown in FIG. 4 is carried out when voice frames are transmitted from the base station controller 1 through the first and/or second common communication lines 110 and 210, after the first and second base stations 100 and 200 and the base station controller 1 have acquired activity ratios of the first and second common communication lines 110 and 210.

First, it is judged in step S401 that an activity ratio of the first and/or second common communication lines 110 and 210 is within any one of ranges of the activity ratios $\eta_n$ defined in the abandonment list illustrated in FIG. 3.

If the activity ratio is not within any one of the ranges of the activity ratios $\eta_n$ defined in the abandonment list (NO in step S401), voice frames are transmitted to a target mobile station from the base station controller 1 through the first and/or second common communication lines 110 and 210, in step S405.

If the activity ratio is within any one of the ranges of the activity ratios $\eta_n$ defined in the abandonment list (YES in step S401), it is judged in step S402 whether the number of base stations to which a target mobile station is connected is equal to or greater than the minimum number Cn.

If the number of base stations to which a target mobile station is connected is smaller than the minimum number Cn (NO in step S402), voice frames are transmitted to a target mobile station from the base station controller 1 through the first and/or second common communication lines 110 and 210, in step S405.

If the number of base stations to which a target mobile station is connected is equal to greater than the minimum number Cn (YES in step S402), it is judged in step S403 whether voice frames having a rate Rn are to be abandoned at an abandonment ratio Dn, or transmitted to a target mobile station.

If voice frames are judged to be transmitted to a target mobile station, voice frames are transmitted to a target mobile station from the base station controller 1 through the first and/or second common communication lines 110 and 210, in step S405.

If voice frames are judged to be abandoned, voice frames are abandoned in step S404.

Hereinbelow is explained an operation of the system in detail with reference to FIGS. 1 to 4.

The base station controller 1 carries out a process of avoiding congestion as follows, when an activity ratio of the second common communication line 210 in a down direction is increased. When an activity ratio of the second common communication line 210 in an up direction is increased, the same process is carried out by the first and/or second base stations 100 and 200.

When an activity ratio of the second common communication line 210 in a down direction is smaller than 70%, there does not exist the table number "n" in the abandonment list, corresponding to such an activity ratio (NO in step S401). As a result, the base station controller 1 transmits voice frames 33 and 23 to the first and second mobile stations 101 and 201, in step S405.

When an activity ratio of the second common communication line 210 in a down direction reaches 70%, the table number 1 is selected in step S401.

Then, it is judged in step S402 whether the number of base stations to which a target mobile station is connected is equal to or greater than the minimum number Cn. The minimum number $C_1$ corresponding to the table number 1 is equal to 3. Since the number of base stations to which the first and second mobile stations 101 and 201 are connected is smaller than three (3), the base station controller 1 transmits voice frames 34 and 24 to the first and second mobile stations 101 and 201, in step S405.

When an activity ratio of the second common communication line 210 in a down direction reaches 80%, the table number 2 is selected in step S401.

The minimum number $C_2$ corresponding to the table number 2 is equal to 2. Since the first mobile station 101 is connected to the two base stations 100 and 200, the first mobile station 101 meets the minimum number requirement (YES in step S402).

Then, a voice frame 35 of ⅛ rate is judged to be abandoned by 90% ($D_2$). The voice frame 35 is abandoned in step S404.

On the other hand, the second mobile station 201 is connected to only one base station 200. Hence, the second mobile station 201 meets the minimum number requirement (NO in step S402). As a result, the base station controller 1 transmits voice frame 25 to the second mobile station 201, in step S405.

When an activity ratio of the second common communication line 210 in a down direction reaches 90%, the table numbers 3 and 4 are selected in step S401.

The minimum numbers $C_3$ and $C_4$ corresponding to the table numbers 3 and 4 are both equal to 2. Since the first mobile station 101 is connected to the two base stations 100 and 200, the first mobile station 101 meets the minimum number requirement (YES in step S402).

Then, it is judges in step S403 whether a voice frame 36 of ¼ rate is to be abandoned by 50% ($D_2$) or transmitted to the first mobile station 101.

If the voice frame 36 is judged to be abandoned, the voice frame 36 is abandoned in step S404.

If the voice frame 36 is judged to be transmitted, the base station controller 1 transmits the voice frame 36 to the first mobile station 101, in step S405.

On the other hand, the second mobile station 201 is connected to only one base station 200. Hence, the second mobile station 201 meets the minimum number requirement (NO in step S402). As a result, the base station controller 1 transmits voice frame 26 to the first mobile station 101, in step S405.

Though the two base stations 100 and 200 are connected to the base station controller 1 through the first and second common communication lines 110 and 210, respectively, in the above-mentioned embodiment, any number of base stations may be connected to the base station controller 1 through a common communication line or common communication lines.

As mentioned earlier, the conventional systems are accompanied further with a problem that when a common communication line connecting a base station and a base station controller to each other becomes congested, and hence, voice frames of a mobile station which is in a non soft-hand-off condition and which is connected to the base station controller through the common communication line which is a sole communication line for the mobile station, are abandoned, voice data lacks between the mobile station and the base station controller, resulting in degradation in communication quality.

In accordance with the above-mentioned embodiment, if the base station controller 1 judges that the second common communication line 210 connecting the second base station 200 and the base station controller 1 to each other may be congested due to an increase in traffic, the low-rate voice frames 35 and 36 addressed to the first mobile station 101 which uses a plurality of common communication lines and which is in a soft-hand-off condition are first abandoned. Hence, it would be possible to reduce traffic in the second common communication line 210, and protect voice frames addressed to the second mobile communication 201 using the second common communication line 210 as a sole communication line, ensuring degradation in communication quality.

The system for avoiding congestion in mobile communication having been mentioned so far may be operated by a program including various commands, and be presented through a recording medium readable by a computer.

In the specification, the term "recording medium" means any medium which can record data therein. Examples of a recording medium are illustrated in FIG. 5.

The term "recording medium" includes, for instance, a disk-shaped recorder 401 such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk 402, a memory chip 404 such as RAM (Random Access Memory) or ROM (Read Only Memory), EPROM (Erasable Programmable Read Only Memory), EEPROM (Electrically Erasable Programmable Read Only Memory), Smart Media (a Registered Trade Mark), a flash memory, a rewritable card-type ROM 405 such as a compact flash card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

As a computer 400, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-046500 filed on Feb. 23, 2000 including specification, claims, drawings and summary is incorporated herein by reference in its entirety.

What is claimed is:

1. A system for avoiding congestion in mobile terminal communication, comprising:

(a) a plurality of mobile stations;
    (b) a plurality of base stations; and
    (c) a base station controller connected to said base stations through a common communication line,
    wherein each of said mobile stations having a soft-hand-off function by which each of said mobile stations can make communication with said base stations, and having a function of encoding voice signals transmitted to and received from said base station controller, with a variable rate, and
    wherein said base station controller monitors an activity ratio of a down common communication line and when it is judged that said activity ratio of a down common communication line is congested, said base station controller assigns an order of precedence to each of said mobile stations which uses said common communication line, based on the number of base stations to which each of said mobile stations concurrently makes communication, and said base station controller abandons low-rate voice frames at a constant ratio among voice frames of a mobile station to which a low order of precedence is assigned.

2. The system as set forth in claim 1, wherein said base station controller, when said activity rate increases, gradually increases said ratio at which voice frames are abandoned among all voice frames, said rate of said voice frames, and said order of precedence of a mobile station transmitting and receiving voice frames to be abandoned.

3. The system as set forth in claim 1, wherein said base station controller includes a first memory to store therein a first list of base stations to which each of said mobile stations using said common communication line concurrently makes communications, and wherein if there is a change in base stations to which each of said mobile stations concurrently makes communications, said first memory reflects said change to said list.

4. The system as set forth in claim 1, wherein each of said base stations includes a second memory to store therein a first list of base stations to which each of said mobile stations using said common communication line concurrently makes communications, and wherein if there is a change in base stations to which each of said mobile stations concurrently makes communications, said first memory reflects said change to said list.

5. The system as set forth in claim 1, wherein said base station controller includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

6. The system as set forth in claim 1, wherein each of said base stations includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

7. The system as set forth in claim 5, wherein said base station controller, when said activity ratio of said down common communication line reaches said threshold activity ratio, abandons voice frames at said rate and at said ratio without transmitting to said down common communication line in a mobile station or mobile stations using said down common communication line and connected to said base stations in a number equal to or greater than said minimum number of base stations.

8. The system as set forth in claim 6, wherein each of said base stations, when said activity ratio of said up common communication line reaches said threshold activity ratio, abandons voice frames at said rate and at said ratio without transmitting to said up common communication line in a mobile station or mobile stations using said up common communication line and connected to said base stations in a number equal to or greater than said minimum number of base stations.

9. A system for avoiding congestion in mobile terminal communication, comprising:

(a) a plurality of mobile stations;
    (b) a plurality of base stations; and
    (c) a base station controller connected to said base stations through a common communication line,
    wherein each of said mobile stations having a soft-hand-off function by which each of said mobile stations can make communication with said base stations, and having a function of encoding voice signals transmitted to and received from said base station controller, with a variable rate, and
    wherein each of said base stations monitors an activity ratio of an up common communication line and when it is judged that said activity ratio of an up common communication line is congested, said base station assigns an order of precedence to each of said mobile stations which uses said common communication line, based on the number of base stations to which each of said mobile stations concurrently makes communication, and said base station abandons low-rate voice frames at a constant ratio among voice frames of a mobile station to which a low order of precedence is assigned.

10. The system as set forth in claim 9, wherein said base station controller, when said activity rate increases, gradually increases said ratio at which voice frames are abandoned among all voice frames, said rate of said voice frames, and said order of precedence of a mobile station transmitting and receiving voice frames to be abandoned.

11. The system as set forth in claim 9, wherein said base station controller includes a first memory to store therein a first list of base stations to which each of said mobile stations using said common communication line concurrently makes communications, and wherein if there is a change in base stations to which each of said mobile stations concurrently makes communications, said first memory reflects said change to said list.

12. The system as set forth in claim 9, wherein each of said base stations includes a second memory to store therein a first list of base stations to which each of said mobile stations using said common communication line concurrently makes communications, and wherein if there is a change in base stations to which each of said mobile stations concurrently makes communications, said first memory reflects said change to said list.

13. The system as set forth in claim 9, wherein said base station controller includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

14. The system as set forth in claim 9, wherein each of said base stations includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

15. The system as set forth in claim 13, wherein said base station controller, when said activity ratio of said down common communication line reaches said threshold activity ratio, abandons voice frames at said rate and at said ratio without transmitting to said down common communication line in a mobile station or mobile stations using said down common communication line and connected to said base stations in a number equal to or greater than said minimum number of base stations.

16. The system as set forth in claim 14, wherein each of said base stations, when said activity ratio of said up common communication line reaches said threshold activity ratio, abandons voice frames at said rate and at said ratio without transmitting to said up common communication line in a mobile station or mobile stations using said up common communication line and connected to said base stations in a number equal to or greater than said minimum number of base stations.

17. A method of avoiding congestion in a mobile terminal communication system comprising: (a) a plurality of mobile stations; (b) a plurality of base stations; and (c) a base station controller connected to said base stations through a common communication line, each of said mobile stations having a soft-hand-off function by which each of said mobile stations can make communication with said base stations, and having a function of encoding voice signals transmitted to and received from said base station controller, with a variable rate, said method comprising the steps of:
(a) monitoring an activity ratio of a down common communication line;
(b) when it is judged that said activity ratio of a down common communication line is congested, assigning an order of precedence to each of said mobile stations using said common communication line, based on the number of base stations to which each of said mobile stations concurrently makes communication; and
(c) abandoning low-rate voice frames at a constant ratio among voice frames of a mobile station to which a low order of precedence is assigned,
said steps (a), (b) and (c) being to be carried out by said base station controller.

18. The method as set forth in claim 17, further comprising the step of, when said activity rate increases, (d) gradually increasing said ratio at which voice frames are abandoned among all voice frames, said rate of said voice frames, and said order of precedence of a mobile station transmitting and receiving voice frames to be abandoned,
said step (d) being to be carried out by said base station controller.

19. The method as set forth in claim 17, further comprising the steps of:
(e) storing therein a first list of base stations to which each of said mobile stations using said common communication line concurrently makes communications; and
(f) if there is a change in base stations to which each of said mobile stations concurrently makes communications, reflecting said change to said list.

20. The method as set forth in claim 19, wherein said steps (e) and (f) are to be carried out by said base station controller.

21. The method as set forth in claim 19, wherein said steps (e) and (f) are to be carried out by each of said base stations.

22. The method as set forth in claim 17, further comprising the step of (g) storing a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

23. The method as set forth in claim 22, wherein said step (g) is to be carried out by said base station controller.

24. The method as set forth in claim 22, wherein said step (g) is to be carried out by each of said base stations.

25. The method as set forth in claim 23, further comprising the step of, when said activity ratio of said down common communication line reaches said threshold activity ratio, (h) abandoning voice frames at said rate and at said ratio without transmitting to said down common communication line in a mobile station or mobile stations using said down common communication line and connected to said base stations in a number equal to or greater than said minimum number of base stations,
said step (h) being to be carried out by said base station controller.

26. The method as set forth in claim 24, further comprising the step of, when said activity ratio of said up common communication line reaches said threshold activity ratio, (i) abandoning voice frames at said rate and at said ratio without transmitting to said up common communication line in a mobile station or mobile stations using said up common communication line and connected to said base stations in a number equal to or greater than said minimum number of base stations,
said step (i) being to be carried out by each of said base stations.

27. A method of avoiding congestion in a mobile terminal communication system comprising: (a) a plurality of mobile stations; (b) a plurality of base stations; and (c) a base station controller connected to said base stations through a common communication line, each of said mobile stations having a soft-hand-off function by which each of said mobile stations can make communication with said base stations, and having a function of encoding voice signals transmitted to and received from said base station controller, with a variable rate, said method comprising the steps of:
- (a) monitoring an activity ratio of an up common communication line;
- (b) when it is judged that said activity ratio of an up common communication line is congested, assigning an order of precedence to each of said mobile stations using said common communication line, based on the number of base stations to which each of said mobile stations concurrently makes communication; and
- (c) abandoning low-rate voice frames at a constant ratio among voice frames of a mobile station to which a low order of precedence is assigned, said steps (a), (b) and (c) being to be carried out by each of said base stations.

28. The method as set forth in claim 27, further comprising the step of, when said activity rate increases, (d) gradually increasing said ratio at which voice frames are abandoned among all voice frames, said rate of said voice frames, and said order of precedence of a mobile station transmitting and receiving voice frames to be abandoned, said step (d) being to be carried out by said base station controller.

29. The method as set forth in claim 27, further comprising the steps of:
- (e) storing therein a first list of base stations to which each of said mobile stations using said common communication line concurrently makes communications; and
- (f) if there is a change in base stations to which each of said mobile stations concurrently makes communications, reflecting said change to said list.

30. The method as set forth in claim 29, wherein said steps (e) and (f) are to be carried out by said base station controller.

31. The method as set forth in claim 29, wherein said steps (e) and (f) are to be carried out by each of said base stations.

32. The method as set forth in claim 27, further comprising the step of (g) storing a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

33. The method as set forth in claim 32, wherein said step (g) is to be carried out by said base station controller.

34. The method as set forth in claim 32, wherein said step (g) is to be carried out by each of said base stations.

35. The method as set forth in claim 33, further comprising the step of, when said activity ratio of said down common communication line reaches said threshold activity ratio, (h) abandoning voice frames at said rate and at said ratio without transmitting to said down common communication line in a mobile station or mobile stations using said down common communication line and connected to said base stations in a number equal to or greater than said minimum number of base stations.

said step (h) being to be carried out by said base station controller.

36. The method as set forth in claim 34, further comprising the step of, when said activity ratio of said up common communication line reaches said threshold activity ratio, (i) abandoning voice frames at said rate and at said ratio without transmitting to said up common communication line in a mobile station or mobile stations using said up common communication line and connected to said base stations in a number equal to or greater than said minimum number of base stations, said step (i) being to be carried out by each of said base stations.

37. A recording medium readable by a computer, storing a program therein for causing a computer to operate a base station controller in a system for avoiding congestion in mobile terminal communication, said system, comprising (a) a plurality of mobile stations; (b) a plurality of base stations; and (c) said base station controller connected to said base stations through a common communication line, wherein each of said mobile stations having a soft-hand-off function by which each of said mobile stations can make communication with said base stations, and having a function of encoding voice signals transmitted to and received from said base station controller, with a variable rate, and wherein said base station controller monitors an activity ratio of a down common communication line and when it is judged that said activity ratio of a down common communication line is congested, said base station controller assigns an order of precedence to each of said mobile stations which uses said common communication line, based on the number of base stations to which each of said mobile stations concurrently makes communication, and said base station controller abandons low-rate voice frames at a constant ratio among voice frames of a mobile station to which a low order of precedence is assigned.

38. The recording medium as set forth in claim 37, wherein said base station controller, when said activity rate increases, gradually increases said ratio at which voice frames are abandoned among all voice frames, said rate of said voice frames, and said order of precedence of a mobile station transmitting and receiving voice frames to be abandoned.

39. The recording medium as set forth in claim 37, wherein said base station controller includes a first memory to store therein a first list of base stations to which each of said mobile stations using said common communication line concurrently makes communications, and wherein if there is a change in base stations to which each of said mobile stations concurrently makes communications, said first memory reflects said change to said list.

40. The recording medium as set forth in claim 37, wherein each of said base stations includes a second memory to store therein a first list of base stations to which each of said mobile stations using said common communication line concurrently makes communications, and wherein if there is a change in base stations to which each of said mobile stations concurrently makes communications, said first memory reflects said change to said list.

41. The recording medium as set forth in claim 37, wherein said base station controller includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

42. The recording medium as set forth in claim 37, wherein each of said base stations includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

43. The recording medium as set forth in claim 41, wherein said base station controller, when said activity ratio of said down common communication line reaches said threshold activity ratio, abandons voice frames at said rate and at said ratio without transmitting to said down common communication line in a mobile station or mobile stations using said down common communication line and connected to said base stations in a number equal to or greater than said minimum number of base stations.

44. The recording medium as set forth in claim 42, wherein each of said base stations, when said activity ratio of said up common communication line reaches said threshold activity ratio, abandons voice frames at said rate and at said ratio without transmitting to said up common communication line in a mobile station or mobile stations using said up common communication line and connected to said base stations in a number equal to or greater than said minimum number of base stations.

45. A recording medium readable by a computer, storing a program therein for causing a computer to operate a base station in a system for avoiding congestion in mobile terminal communication, said system, comprising (a) a plurality of mobile stations; (b) a plurality of base stations; and (c) a base station controller connected to said base stations through a common communication line, wherein each of said mobile stations having a soft-hand-off function by which each of said mobile stations can make communication with said base stations, and having a function of encoding voice signals transmitted to and received from said base station controller, with a variable rate, and wherein said base station monitors an activity ratio of an up common communication line and when it is judged that said activity ratio of an up common communication line is congested, said base station assigns an order of precedence to each of said mobile stations which uses said common communication line, based on the number of base stations to which each of said mobile stations concurrently makes communication, and said base station abandons low-rate voice frames at a constant ratio among voice frames of a mobile station to which a low order of precedence is assigned.

46. The recording medium as set forth in claim 45, wherein said base station controller, when said activity rate increases, gradually increases said ratio at which voice frames are abandoned among all voice frames, said rate of said voice frames, and said order of precedence of a mobile station transmitting and receiving voice frames to be abandoned.

47. The recording medium as set forth in claim 45, wherein said base station controller includes a first memory to store therein a first list of base stations to which each of said mobile stations using said common communication line concurrently makes communications, and wherein if there is a change in base stations to which each of said mobile stations concurrently makes communications, said first memory reflects said change to said list.

48. The recording medium as set forth in claim 45, wherein each of said base stations includes a second memory to store therein a first list of base stations to which each of said mobile stations using said common communication line concurrently makes communications, and wherein if there is a change in base stations to which each of said mobile stations concurrently makes communications, said first memory reflects said change to said list.

49. The recording medium as set forth in claim 45, wherein said base station controller includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

50. The recording medium as set forth in claim 45, wherein each of said base stations includes a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

51. The recording medium as set forth in claim 49, wherein said base station controller, when said activity ratio of said down common communication line reaches said threshold activity ratio, abandons voice frames at said rate and at said ratio without transmitting to said down common communication line in a mobile station or mobile stations using said down common communication line and connected to said base stations in a number equal to or greater than said minimum number of base stations.

52. The recording medium as set forth in claim 50, wherein each of said base stations, when said activity ratio of said up common communication line reaches said threshold activity ratio, abandons voice frames at said rate and at said ratio without transmitting to said up common communication line in a mobile station or mobile stations using said up common communication line and connected to said base stations in a number equal to or greater than said minimum number of base stations.

53. A recording medium readable by a computer, storing a program therein for causing a computer to carry out a method of avoiding congestion in a mobile terminal communication system comprising: (a) a plurality of mobile stations; (b) a plurality of base stations; and (c) a base station controller connected to said base stations through a common communication line, each of said mobile stations having a soft-hand-off function by which each of said mobile stations can make communication with said base stations, and having a function of encoding voice signals transmitted to and received from said base station controller, with a variable rate, said method comprising the steps of:
(a) monitoring an activity ratio of a down common communication line;
(b) when it is judged that said activity ratio of an up or down common communication line is congested, assigning an order of precedence to each of said mobile stations using said common communication line, based on the number of base stations to which each of said mobile stations concurrently makes communication; and
(c) abandoning low-rate voice frames at a constant ratio among voice frames of a mobile station to which a low order of precedence is assigned.

54. The recording medium as set forth in claim 53, wherein said method further includes the step of, when said activity rate increases, (d) gradually increasing said ratio at which voice frames are abandoned among all voice frames, said rate of said voice frames, and said order of precedence of a mobile station transmitting and receiving voice frames to be abandoned.

55. The recording medium as set forth in claim 53, wherein said method further includes the steps of:
(e) storing therein a first list of base stations to which each of said mobile stations using said common communication line concurrently makes communications; and (f) if there is a change in base stations to which each of said mobile stations concurrently makes communications, reflecting said change to said list.

56. The recording medium as set forth in claim 53, wherein said method further includes the step of (g) storing a second list in which a rate of voice frames to be abandoned when said activity ratio of said common communication line reaches a threshold activity ratio, a ratio at which voice frames are to be abandoned among all voice frames, and the minimum number of base stations to which a target mobile station is connected are defined for each of activity ratios.

57. The recording medium as set forth in claim 53, wherein said method further includes the step of, when said activity ratio of said down common communication line reaches said threshold activity ratio, (h) abandoning voice frames at said rate and at said ratio without transmitting to said down common communication line in a mobile station or mobile stations using said down common communication line and connected to said base stations in a number equal to or greater than said minimum number of base stations.

* * * * *